Oct. 20, 1970 C. W. MOONEY ET AL 3,535,563

ELECTROMECHANICAL FREQUENCY RESPONSIVE DEVICE
WITH ARMATURE SUPPORTED ON TORSION BAND

Filed April 1, 1969 4 Sheets-Sheet 1

Inventors:-
Charles W. Mooney,
Alfred S. Holzinger,
Mueller, Aichele & Rauner Attys.

Oct. 20, 1970 C. W. MOONEY ET AL 3,535,563

ELECTROMECHANICAL FREQUENCY RESPONSIVE DEVICE WITH ARMATURE SUPPORTED ON TORSION BAND

Filed April 1, 1969 4 Sheets-Sheet 2

Inventors:-
Charles W. Mooney,
Alfred S. Holzinger,

Mueller, Aichele & Rauner Attys.

Inventors:—
Charles W. Mooney.
Alfred S. Holzinger,
Mueller, Aichele & Rauner Attys.

Inventors:-
Charles W. Mooney,
Alfred S. Holzinger,
By Mueller, Aichele & Rauner Attys.

United States Patent Office 3,535,563

Patented Oct. 20, 1970

3,535,563

ELECTROMECHANICAL FREQUENCY RESPONSIVE DEVICE WITH ARMATURE SUPPORTED ON TORSION BAND

Charles W. Mooney, Wheeling, and Alfred S. Holzinger, Chicago, Ill., assignors to Motorola, Inc., Franklin Park, Ill., a corporation of Illinois Continuation-in-part of application Ser. No. 750,042, Aug. 5, 1968. This application Apr. 1, 1969, Ser. No. 811,851

Int. Cl. H02k 33/06

U.S. Cl. 310—25 19 Claims

ABSTRACT OF THE DISCLOSURE

Electromechanical frequency responsive device having balanced armature supporting a pair of magnets and supported from a chassis by a torsion band. The armature, torsion band and support therefor are formed from a metal sheet as an integral member. A pair of coils are positioned on the chassis about the ends of each of the magnets. Shields are provided about the coils to prevent direct coupling therebetween, and conducting sleeves placed therein can be positioned to adjust the Q of the device. The chassis is supported within a housing by a pair of shafts extending from the housing and aligned with the torsion band and resilient sleeves about the shafts supported in hubs in insulating plates secured to the chassis.

This application is a continuation-in-part of application Ser. No. 750,042 filed Aug. 5, 1968.

BACKGROUND OF THE INVENTION

Electromechanical frequency responsive devices have been used to provide sharp tuning of electrical circuits. Such devices have included a vibratory member, such as a reed, having a natural resonant frequency, with a magnetic structure coupled thereto to cause vibrations of the reed at its natural resonant frequency. Electromechanical responsive devices have also been proposed wherein an armature is mounted for rotary movement. The magnetic structure for such devices may include a coil for exciting the same, and a second coil to pick up signals in response to the vibrations, so that signals are coupled therebetween only at the resonant frequency of the vibratory member.

With the trend to miniaturization of electronic equipment by the use of transistors, integrated circuits and the like, the electromechanical frequency responsive devices have become the largest component in small electronic equipment such as selective paging receivers. It is, therefore, not possible to further significantly reduce the size of the equipment unless the frequency responsive device is reduced in size. In connection with the reduction in size of such frequency responsive devices, it is important that the sensitivity not be reduced so that additional equipment is needed to increase the signal level, as this will defeat the advantage of the size reduction.

Further, prior electromechanical frequency responsive devices have been objectionable in that they may provide a response when shock is encountered. That is, if the unit is dropped or jarred, the reed will vibrate and provide a response as though a signal had been received. False operation may also take place when the unit is subject to vibration as when used on a vehicle, such as an automobile operated at high speed, or a motorcycle.

SUMMARY OF THE INVENTION

It is an object of the invention to provide an improved compact electromechanical frequency responsive device.

Another object is to provide a small electromechanical frequency responsive device which can be manufactured at relatively low cost.

A further object of the invention is to provide an electromechanical frequency responsive device which is sensitive to actuating signals and relatively insensitive to physical shock.

A still further object of the invention is to provide an electromechanical frequency responsive device wherein the response is not sensitive to the effect of gravity and wherein spurious responses are minimized.

The electromechanical frequency responsive device in accordance with the invention includes a balanced armature having a pair of permanent magnets connected thereto, and which is supported on a torsion band mounted from a chassis. The torsion band, armature and a support portion for the band are integrally formed from a metal sheet by chemical milling. The torsion band is made thinner than the other parts by the chemical milling, and may be further reduced in thickness by directing a stream of abrasive powder thereagainst. The support portion is secured to the chassis which also supports coils about the ends of the magnets. The coils are shielded so that coupling is provided only through the magnets, and conducting sleeves may be adjustably positioned in the coils to provide Q control. The coils on each side of the armature are connected in series opposition to cancel undesired responses.

To isolate the vibrating structure formed by the torsion band and the armature from external vibration and shock, the chassis may be supported in a housing by shafts secured to the housing and aligned with the torsion band, and resilient sleeves about the shafts provided in hubs formed on supporting plates which are secured to the chassis. The housing completely encloses the unit and may have connecting pins extending therefrom providing a plug-in mounting for the unit, as well as making electrical connections to the coils of the unit.

Stop arms can be secured to the torsion band to limit twisting thereof about an axis along the armature to reduce the effect of severe shocks. Also the armature can be curved to increase its length to thereby lower the spring rate of the assembly including the armature and magnets.

DESCRIPTION OF THE ILLUSTRATED EMBODIMENT

Figures 1, 2, 3, 4:
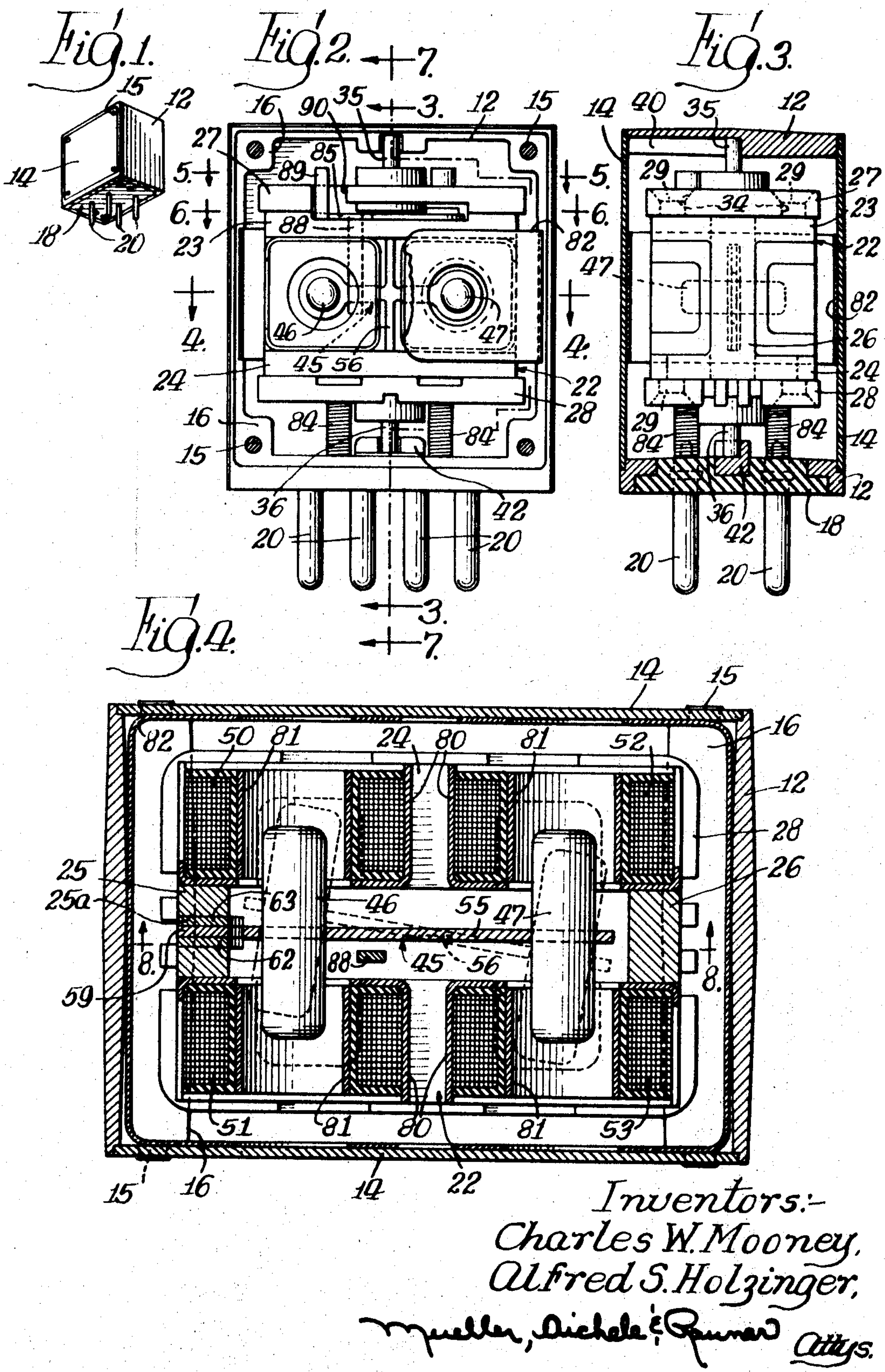
FIG. 1 is a perspective view of the complete frequency responsive device.
FIG. 2 is a cross sectional view through the device showing the parts in assembled relation.
FIGS. 3 to 7 are cross sectional views along the lines 3—3 to 7—7 of FIG. 2.

Referring now to the drawings, FIG. 1 is a perspective view of the electromechanical frequency responsive device of the invention showing the small size thereof. The unit may have a width of about one half inch, a depth of about three eighths of an inch, and a height of about five eighths of an inch. Terminals extend from the unit for supporting the same and making electrical connections thereto.

As shown in FIGS. 1 to 7, the unit has a rectangular housing 12 with rectangular cover plates 14 on each side. The plates 14 are secured to the housing 12 by the use of cast projections 15 on the bosses 16 in the corners of the housing which extend through openings in the plates 14, the ends of which are riveted to hold the plates in position. An insulating wall 18 is provided in an opening on the bottom side of the housing 12 into which are secured the terminals or connecting pins 20. The pins 20 provide a mechanical mounting for the reed device as well as making electrical connections thereto.

The reed device includes a metal chassis 22 (FIGS. 2, 3, 4 and 7) having a top section 23 and a bottom section 24 joined by side supports 25 and 26. A top insulator 27 is secured to the top section 23 and a bottom insulator 28 is secured to the bottom section 24. Projections 29 extend from the top and bottom sections 23 and 24 of the chassis and are received in openings 34 in the top and bottom insulators 27 and 28, respectively. These projections are of tubular shape and are flared at the ends to hold the insulators and the chassis in assembled relation.

Figures 5, 6, 7, 12, 13:
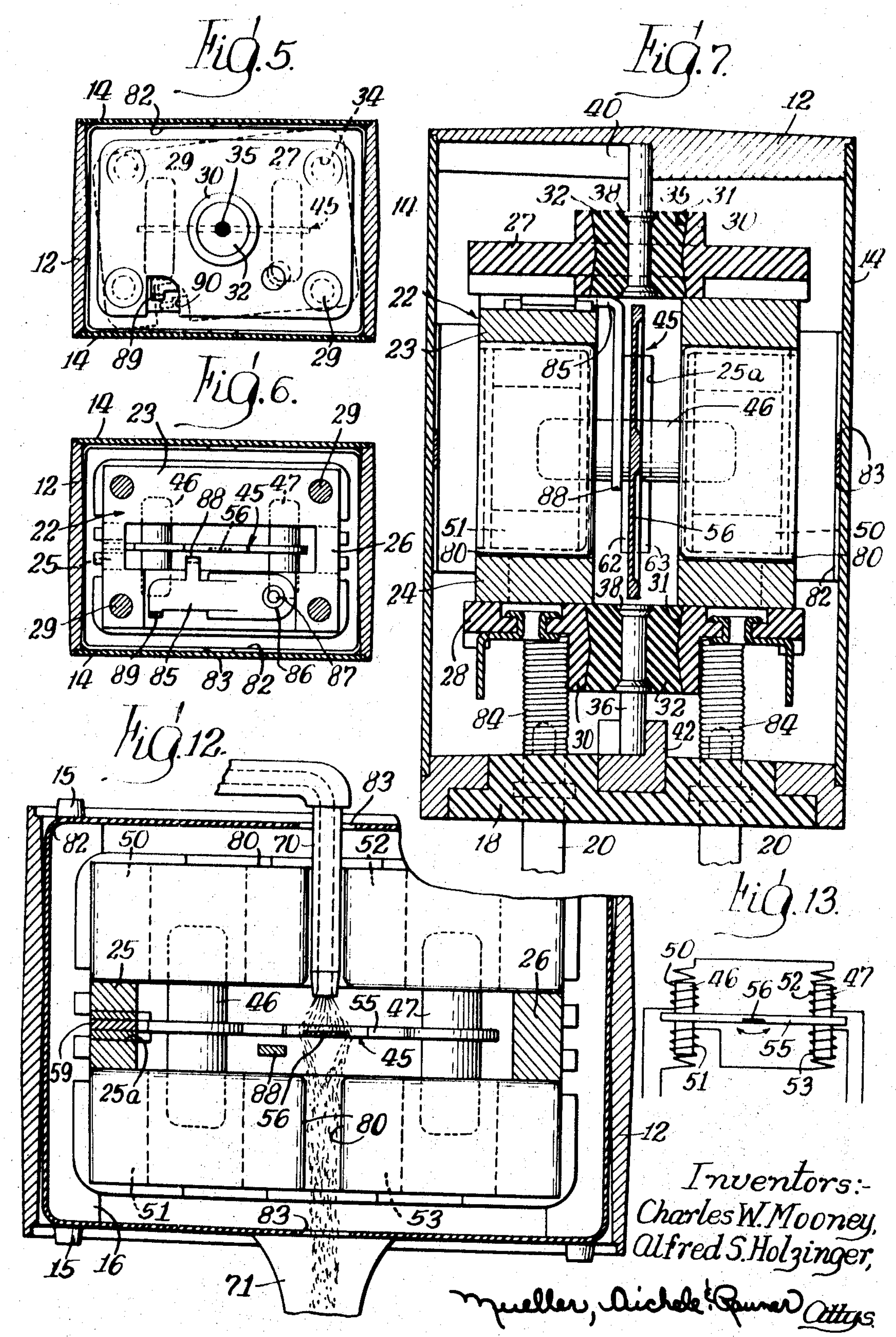
FIG. 12 illustrates the process of adjusting the thickness of the torsion band by a flow of abrasive powder.
FIG. 13 shows the interconnection of the coils of the device.
Figure 8:
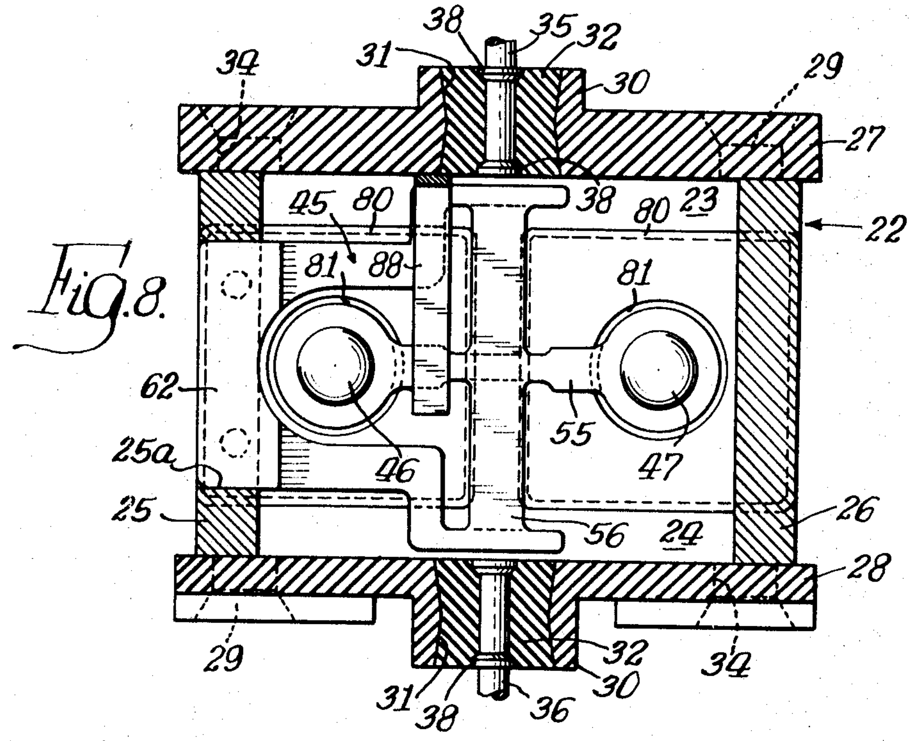
FIG. 8 is a cross sectional view along the lines 8—8 of FIG. 4 illustrating the torsion band, armature and supporting portion therefor assembled in the device.

The insulators 27 and 28 each have a central hub 30 with an opening 31 therein for receiving a resilient sleeve 32 (FIGS. 7 and 8). Supporting shafts 35 and 36 secured to the housing 12 extend through the resilient sleeves 32 and have rims 38 thereon for holding the shafts and resilient sleeves in position with respect to each other. The shaft 35 is positioned in a slot 40 in the top wall of housing 12, and the shaft 36 is positioned in a slot in support 42 secured to housing 12. The engaging surfaces of the sleeve 32 remain fixed with respect to the shafts and the hubs, and the resilient action within the sleeves permits the insulators to move with respect to the supporting shafts. FIG. 5 shows the insulators and chassis rotated with respect to the housing through the action of the resilient sleeves.

Figures 9, 10, 11:
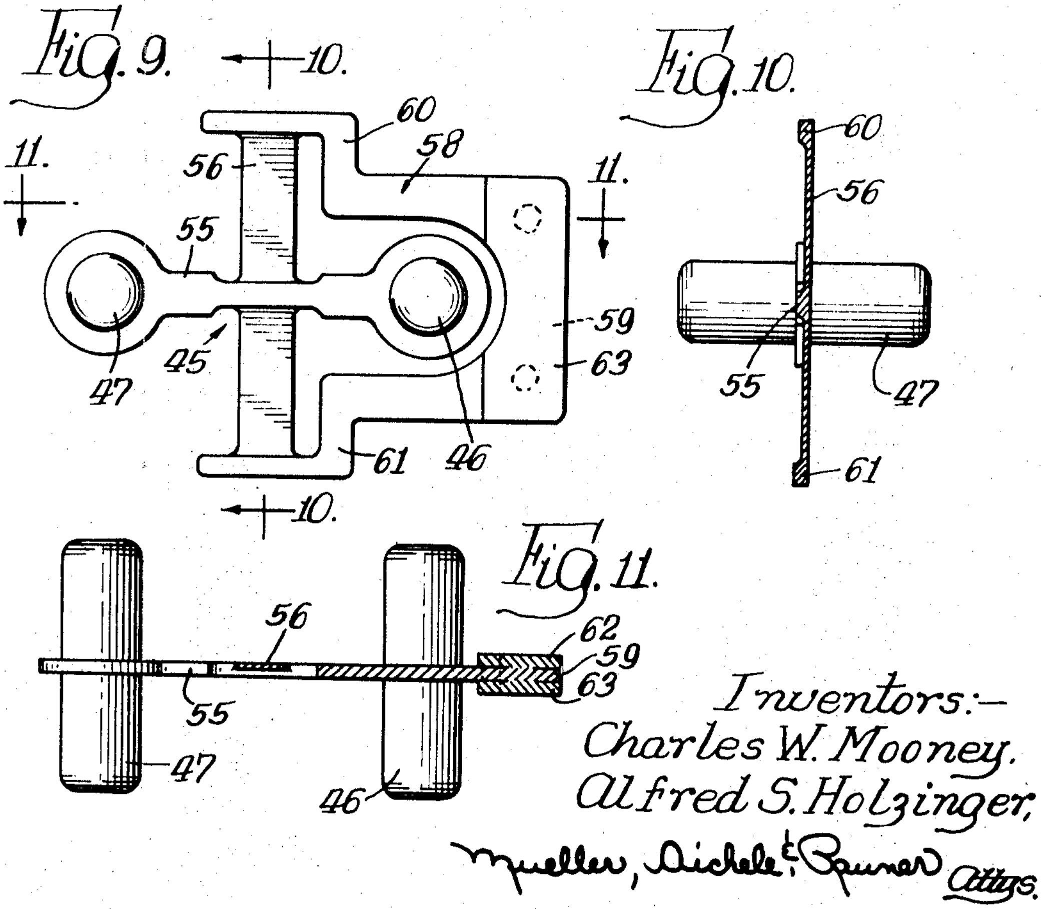
FIG. 9 is a plan view of the integral member which forms the vibratory structure including the torsion band, armature and supporting portion.
FIGS. 10 and 11 are cross sectional views along the lines 10—10 and 11—11 of FIG. 9.

As shown by FIGS. 4 and 8, the chassis 22 supports the torsional vibratory structure 45 which includes a movable armature 55 having a pair of permanent magnets 46 and 47 mounted thereon. The armature 55 is supported for pivotal movement by torsion band 56, and pivots so that the magnets move with respect to the coils 50, 51, 52 and 53, which are supported by the chassis 22. As shown in FIGS. 9, 10 and 11 the movable armature 55 is integral with the torsion band 56, and with a supporting portion 58 having a mounting section 59 and extending arms 60 and 61 secured to the band.

The torsion band 55 has its axis in substantial alignment with the shafts 35 and 36, as is best shown by FIG. 8. The resilient mounting of the chassis 22 from the shafts acts to isolate the vibratory structure from external vibration or shock which would tend to cause pivotal movement of the armature about the axis extending through the torsion band and the shafts.

The torsion band 56, armature 55 and supporting portion 58 may be formed from a flat piece of sheet material by chemical milling. The sheet may be made of an iron-nickel alloy such as Elinvar Extra, which may be obtained from the Hamilton Watch Co., Lancaster, Pa. The sheet may have a thickness of the order of .012 inch and is masked on both sides at the areas forming the armature 55 and supporting portion 58 so that these areas remain at the thickness of the sheet. The area forming the torsion band 56 is masked on only one side so that the other side is milled away to make the band thinner than the armature 55 and the supporting portion 58 (FIGS. 10 and 11). By control of the chemical milling process, the thickness of the band can be determined to thereby control the frequency response of the device.

For further control of the frequency, a flow of abrasive powder can be directed on the torsion band to reduce the thickness thereof. This is illustrated in FIG. 12 wherein the device, assembled except for the cover plates 14, is positioned so that a stream of abrasive powder is directed on the torsion band 56. The nozzle 70 extends between the coils 50 and 52 and directs a stream of abrasive powder on the upper surface of the band 56 to reduce the thickness thereof. The nozzle can be directed to the portion of the band 56 on one side of the armature 55, and then to the portion on the other side of the armature so that both portions will have substantially the same thickness. Two nozzles can be provided to direct abrasive powder against the two portions of the torsion band simultaneously. The abrasive material, as well as the particles removed from the band, are picked up by suction developed at the duct 71 below the device, which may be connected to a vacuum pump. The response frequency can be checked while the device is so positioned to provide very precise frequency characteristics.

The torsion band 56 has a rectangular cross section. In order to provide maximum efficiency and output, and a substantially linear response, it has been found that the ratio of the width to the thickness of the torsion band should be of the order of ten to one. For frequency response in the range from 67 to 150 hertz, the torsion band can have a length of about .260 inch, a width in the range from about .014 to .020 inch, and a thickness in the range from .0013 to .0019 inch. For higher frequencies the width and thickness of the band can be increased. In the structures illustrated, deflection of the armature of as much as plus and minus 12 degrees has been used.

Side 25 of the chassis 22 has a slot *25a* therein (FIG. 4) into which the mounting portion 59 of the vibratory structure is secured by brazing or the like. Plates 62 and 63 (FIGS. 4 and 13) are welded to the two sides of the mounting section 59 prior to the securing thereof in slot *25a* to render the same more rigid. The torsion band 56 and the armature 55 are mounted with respect to the chassis, and the magnets 46 and 47 with respect to the coils 50 to 53 positioned on the chassis, as best shown in FIGS. 2, 4 and 8.

To shield the signals in coils 50 to 53 from coupling with each other, conducting shields 80 are provided about the coils (FIG. 4). It is desired that there be no direct coupling between the coils, with the coupling being only from the drive coils 50 and 52 to the permanent magnets 46 and 47, and from the permanent magnets to the pick-up coils 51 and 53. This causes the device to respond only at the resonant frequency of the vibratory structure including the torsion band 56 and the armature 55.

A magnetic shield 82 is provided within the housing about the coils 50 to 53. This acts to shield the unit from external signals, and to prevent interference from magnetic signals developed in the unit. The shield 82 has notches 83 therein to receive the nozzle 70 which directs the abrasive powder onto the torsion band 56, and to provide a path for the powder to flow to the duct 71.

To control the Q of the vibrating system, conducting sleeves 81 may be provided within the coils 50 to 53. The thickness of these sleeves can be selected to control the resistance of the shorted turns formed thereby, to control the Q of the device. The Q can also be adjusted by control of the strength of the magnets 46 and 47. By use of these controls, devices can be provided having Q's in the range from 100 to 1500 without objectionable insertion loss.

FIG. 13 shows the interconnection between the coils 50 to 53 in a typical device. Coils 50 and 52 which are on one side of the armature 55, are connected in series opposing relation and can serve as the drive coils. Coils 51 and 53 are likewise connected in series opposing relation and can serve as the pick-up coils. The magnets are poled so that like poles are on the same side of the armature so that current through coil 50 which tends to pull the magnet 46 further into the coil will flow through coil 52 in a direction to push the magnet 47 out of the coil to cause the armature 55 to pivot about the torision band 56, and to cause the band to twist. This will, of course, cause the magnet 46 to move out of the coil 51 and the magnet 47 to move further into the coil 53. The signals developed in coils 51 and 53, because of the series opposing connection, will add to provide the output signal. It will be apparent that if the magnets are positioned with opposite poles on the same side of the armature, and the coils are connected in series adding relation, the same effect will be provided. Because of the relation described, lateral movement of the armature 55 which causes the magnets 46 and 47 to move together, either into or out of both coils 51 and 53, will produce signals in the pick-up coils 51 and 53 which cancel each other. Therefore, movement of the armature 55 longitudinally, rather than pivotally, will produce no output signal. This is a distinct advantage as the device may be used in applications wherein it is subject to physical shock, and the physical shock will tend to produce longitudinal movement of the armature which will not affect the output.

As shown in FIGS. 2, 3 and 7, conducting coil springs 84 are provided to make electrical connections between the terminal pins 20 of the device and the coils 50 to 53 inclusive. The springs provide a continuous connection to the coils when the chassis moves with respect to the housing, as has been described.

As best shown in FIGS. 2 and 6, a stop can be provided for limiting the movement of the armature 55. The stop has a mounting portion 85 with an opening 86 therein which fits over an upstanding projection 87 on the top plate 23 of the chassis. A finger 88 extends downwardly into a position to be engaged by the armature 55. An upwardly extending portion 89 is positioned in a notch 90 provided in the top insulator 27, and is adjustably placed with respect to the insulator to set the position of the finger 88 with respect to the armature 55. The stop is set to permit the armature to swing through the amplitude required to provide the desired signal, and to limit the amplitude so that distortion is minimized. It may be desired to set the stop at different positions for devices operating at different frequencies, and the portion 89 can be cemented to the insulator to fix the position after the device is assembled.

Figure 14:
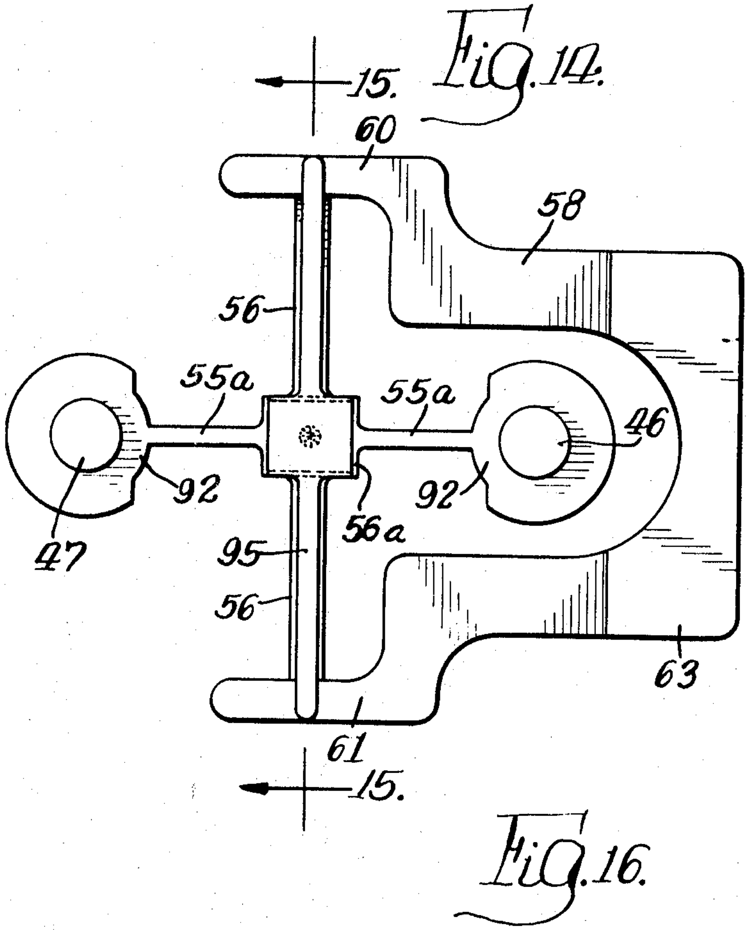
FIGS. 14, 15 and 16 illustrate a modified construction of the vibratory structure of the frequency responsive device.
Figure 15:
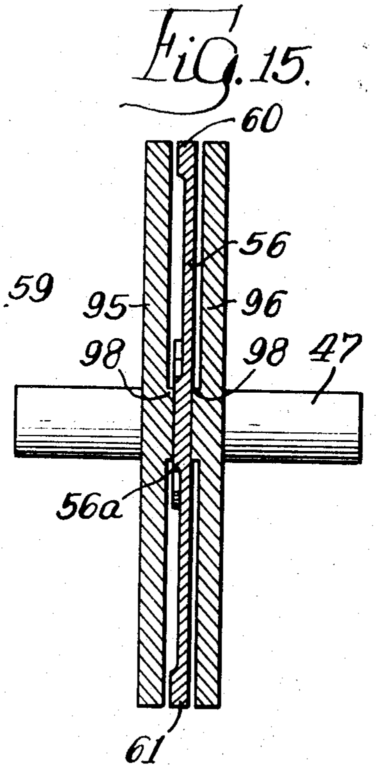
Figure 16:
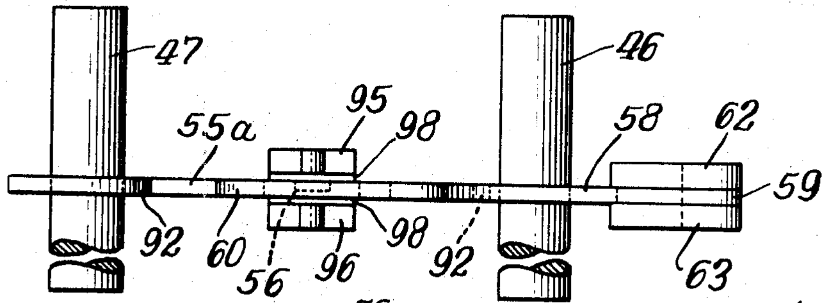

A modification of the vibratory structure 45 of the frequency responsive device is illustrated in FIGS. 14, 15 and 16. The supporting portion 58 of the vibratory structure is of the same construction as that shown in FIG. 9. It is also supported in the chassis in the manner illustrated in FIGS. 4 and 8. Plates 62 and 63 are provided on opposite sides of the mounting section 59 for securing the supporting portion 58 in the slot **25*a* in the chassis 22**, as shown in FIG. 4.

The torsion band 56 is of generally the same construction as previously shown, except that a rectangular portion **56*a* is provided at the junction of the torsion band 56 and the armature 55*a*. The armature 55*a* is of reduced width as compared to the structure shown in FIG. 9, and the annular portions at the ends thereof for supporting the magnets 46 and 47 are cut away at the points marked 92 to effectively lengthen the armature 55*a***. This construction of the armature relieves he shock loading on the torsion band, and provides a lower spring rate for the assembly including the armature and the magnets so that energy from shock is more effectively dissipated. Also, the parts of the vibratory structure are shaped so that the resonant frequencies of the parts other than the torsion band are different from the torsion reed frequency which is used.

To prevent twisting of the torsion band 56 about an axis along the armature **55*a*, stop arms 95 and 96 are secured to the band. These arms have projecting portions 98 which engage the rectangular center portion 56*a* of the band 56, and are welded thereto. As best shown in FIG. 15, twisting motion of the torsion band about an axis aligned with the armature 55*a* will cause the ends of the arms 95 and 96 to engage the arms 60 and 61 of the supporting portion 58. The stop arms act to limit such motion which can take place when the reed device is dropped a substantial distance to cause a very strong shock. The stop arms 95 and 96 can be secured to the torsion band by a single spot weld between the projections 98 thereon and the rectangular portion 56*a* of the torsion band 56. The stop arms are added after the reed has been pretuned by the application of an abrasive thereto, as is described in connection with FIG. 12. Further precise tuning of the reed device can be accomplished by applying abrasive to the torsion band after the stop arms 95 and 96** have been secured thereto.

Figure 17:
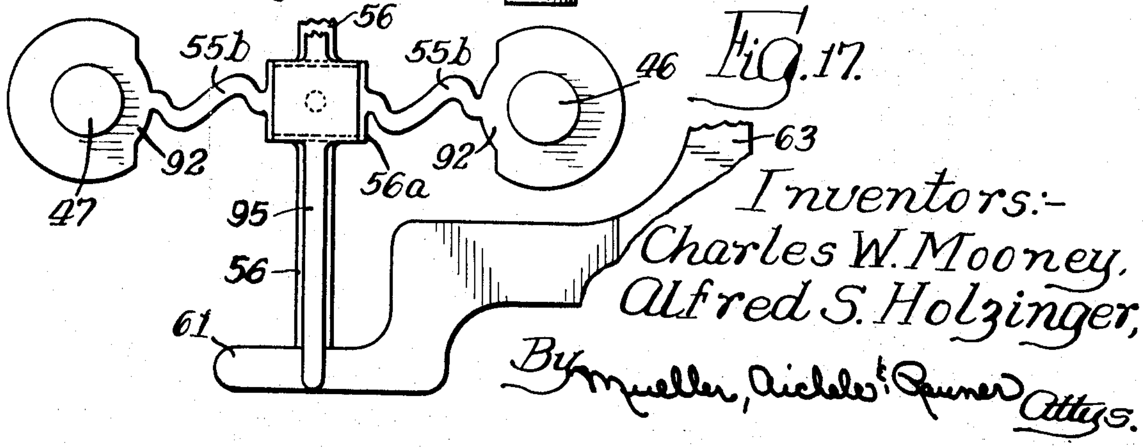
FIG. 17 illustrates a further modification of the armature thereof.

The length of the armature can be further increased by curving the same, as is shown by the armature **55*b* in FIG. 17. In addition to lowering the spring rate of the armature and magnets, the curves provide resilience along the axis of the armature so that shock resulting from the weight of magnets is absorbed. The curved armature can be used with the stop arms 95 and 96** which limit the twist of the torsion band to permit larger deflection under condition of shock without causing plastic strain (permanent set) in the torsion band or the armature.

The electromechanical frequency responsive device which has been described has been found to be highly effective. The unit is extremely small and still provides sharp selectivity and good sensitivity. The device is relatively insensitive to physical shock. Effective Q control is provided so that the characteristics can be changed as required for various different applications.

We claim:

1. An electromechanical frequency responsive device including in combination, a flat vibratory structure including support means having first and second spaced portions, an elongated torsion band having first and second ends secured to and supported by said first and second portions, and an elongated armature supported adjacent the center portion thereof by said torsion band intermediate said ends thereof and extending substantially perpendicular to said band, first and second elongated permanent magnets supported adjacent the ends of said armature and each extending substantially perpendicular to said armature and having ends on opposite sides thereof, and a coil positioned about at least one end of each of said magnets.

2. A device in accordance with claim 1 including stop means secured to said torsion band adjacent the center portion thereof and having portions adjacent said first and second spaced portions of said support means, said stop means limiting the movement of said torsion band about an axis aligned with said armature.

3. A device in accordance with claim 1 wherein said support means, said torsion band and said armature are formed as an integral member.

4. A device in accordance with claim 3 including first and second stop arms extending parallel to and on opposite sides of said torsion band, said arms having central projections secured to said center portion of said torsion band and ends positioned in spaced relation with said spaced portions of said support means.

5. A device in accordance with claim 1 wherein said torsion band is of rectangular cross-section having a width substantially greater than its thickness.

6. A device in accordance with claim 1 wherein said armature has curved portions to increase the length thereof.

7. A device in accordance with claim 1 including a chassis for suporting said support means and said coils.

8. A device in accordance with claim 7 further including a housing and mounting means having resilient portions for mounting said chassis to said housing and for providing vibraton isolation therebetween.

9. A device in accordance with claim 8 wherein said mounting means includes first and second shafts secured to said housing and aligned with said torsion band.

10. A device in accordance with claim 9 wherein said resilient portions are sleeves formed of resilient material positioned about said shafts, and including means secured to said chassis for receiving said sleeves.

11. A device in accordance with claim 9, including a top plate and a bottom plate secured to said chassis and each having a central hub, and wherein said resilient portions are sleeves formed of rubber positioned about said shafts and within said hubs.

12. A device in accordance with claim 1 wherein the polarity of said magnets is related to the connection of said coils so that movement of said magnets in parallel relation in the same direction produces signals in said coils which tend to cancel each other.

13. A vibratory structure for an electromechanical frequency responsive device including an integral member formed from sheet material having a supporting portion with a pair of arms extending therefrom, an elongated torsion band of rectangular cross-section extending between said arms and having ends held in fixed positions by said arms, and an elongated armature extending from an intermediate point on said band at substantially right angles to said band.

14. A vibratory structure in accordance with claim 13 wherein said torsion band has a width of the order of ten times the thickness thereof.

15. A vibratory structure in accordance with claim 13 further including a pair of stop arms extending parallel to and on opposite sides of said torsion band, said stop arms each having a projection adjacent the center thereof secured to said intermediate point on said band and ends adjacent said arms of said supporting portion for engaging said arms to limit the movement of said band about an axis aligned with said elongated armature.

16. The structure of claim 13 wherein said supporting portion, said arms and said armature have greater thickness than said torsion band, with said torsion band having dimensions to control the resonant frequency of vibration of said armature with respect to torsional movement.

17. The structure of claim 13 wherein said armature has portions at each end thereof for receiving a magnet, and curved portions intermediate said end portions for effectively increasing the length of said armature.

18. An electromechanical frequency responsive device including a chassis, a vibratory structure including an elongated torsion band supported at its ends, said vibratory structure being supported on said chassis, a housing for enclosing said chassis having first and second opposite ends, first and second shafts extending within said housing from said opposite ends thereof, said chassis having means at opposite ends thereof forming hubs positioned about said shafts, and sleeves of resilient material positioned about said shafts and within said hubs, said shafts and said sleeves serving to mount said chassis to said housing and providing vibration isolation therebetween.

19. A device in accordance with claim 18 wherein said vibratory structure includes an elongated armature extending transversely of said torsion band and secured thereto adjacent the center of said band, and further including stop means secured to said chassis to limit the movement of said armature resulting from torsional movement of said band.

References Cited

UNITED STATES PATENTS

| | | | |
|---|---|---|---|
| 2,174,296 | 9/1939 | Wallace | 333—71 |
| 3,448,304 | 6/1969 | Marti | 58—23 XR |
| 3,360,704 | 12/1967 | Kohlhagen | 318—128 |
| Re. 26,361 | 3/1968 | Mooney et al. | 331—156 XR |
| 3,183,382 | 5/1965 | O'Neal | 310—17 |
| 2,877,365 | 3/1959 | Dostal | 310—25 |
| 3,214,662 | 10/1965 | DeWolf | 318—138 XR |
| 2,577,051 | 12/1951 | Voegtlin et al. | 333—71 XR |
| 2,296,754 | 9/1942 | Wolf et al. | 340—17 |
| 2,928,057 | 3/1960 | Jarger | 333—71 |
| 3,150,337 | 9/1964 | Allison | 333—71 |
| 3,064,213 | 11/1962 | Mason | 333—71 |

FOREIGN PATENTS

| | | |
|---|---|---|
| 670,905 | 3/1968 | Netherlands. |

WARREN E. RAY, Primary Examiner

B. A. REYNOLDS, Assistant Examiner

U.S. Cl. X.R.

310—36; 318—126; 331—156; 333—71; 335—277